United States Patent
Halleen et al.

(10) Patent No.: US 12,406,034 B2
(45) Date of Patent: *Sep. 2, 2025

(54) DIGITAL RIGHTS PROTECTED CONTENT PLAYING

(71) Applicant: Disney Enterprises, Inc., Burbank, CA (US)

(72) Inventors: Michael Halleen, Los Angeles, CA (US); William L. Rogers, Glendale, CA (US); Lily Zhuo, Los Angeles, CA (US); Cameron S. Pierce, Inglewood, CA (US)

(73) Assignee: Disney Enterprises, Inc., Burbank, CA (US)

( * ) Notice: Subject to any disclaimer, the term of this patent is extended or adjusted under 35 U.S.C. 154(b) by 306 days.

This patent is subject to a terminal disclaimer.

(21) Appl. No.: 18/143,459

(22) Filed: May 4, 2023

(65) Prior Publication Data

US 2023/0267179 A1    Aug. 24, 2023

Related U.S. Application Data

(63) Continuation of application No. 16/882,330, filed on May 22, 2020, now Pat. No. 11,669,596.

(51) Int. Cl.
*G06F 21/10* (2013.01)
*G06F 21/62* (2013.01)
*G06Q 30/0241* (2023.01)

(52) U.S. Cl.
CPC ............ *G06F 21/10* (2013.01); *G06F 21/629* (2013.01); *G06Q 30/0277* (2013.01); *G06F 2221/2141* (2013.01)

(58) Field of Classification Search
CPC .................. G06F 21/10; G06F 21/629; G06F 2221/2141; G06Q 30/0277
See application file for complete search history.

(56) References Cited

U.S. PATENT DOCUMENTS

| | | | |
|---|---|---|---|
| 10,235,454 B1 * | 3/2019 | Lewis ................. | G06F 16/4387 |
| 2014/0108946 A1 * | 4/2014 | Olofsson ............... | G06F 3/0482 |
| | | | 715/739 |
| 2014/0282886 A1 * | 9/2014 | Karamchedu .......... | H04L 63/10 |
| | | | 726/4 |

* cited by examiner

*Primary Examiner* — Huan V Doan
(74) *Attorney, Agent, or Firm* — Farjami & Farjami LLP

(57) ABSTRACT

A system for performing digital rights protected content playing includes a computing platform having a hardware processor and a memory storing a software code. The hardware processor executes the software code to receive, from a first user, metadata identifying one or more content segment(s), determine whether the first user has a right to access the content segment(s), produce a playlist using the metadata when the first user has the right, and output the playlist to the first user and/or a second user. The hardware processor may further execute the software code to receive the playlist from the second user, determine each content segment identified by the playlist that the second user has a right to access, generate a content compilation that omits any content segment identified by the playlist to which the second user lacks the right, and playout the content compilation to the second user.

20 Claims, 7 Drawing Sheets

DIGITAL RIGHTS PROTECTED CONTENT PLAYING

The present application is a Continuation of U.S. application Ser. No. 16/882,330, filed May 22, 2020.

BACKGROUND

Media content in the form of movie content and television (TV) programming content, for example, is widely sought out and enjoyed by consumers. One source of pleasure for many consumers of movie and TV programming content is the ability to quickly access a favorite movie or TV scene without playing the movie or TV program that includes the scene in its entirety. Another source of pleasure for many consumers is playing back favorite scenes with friends or family.

The desire by a consumer to gain quick play of preferred portions of content for personal enjoyment, may cause the consumer to make a personalized content clip by denoting favorite segments of content from the original and stringing those segments together. That personalized content clip can then be sent to friends or family, or posted to a social media platform. Unfortunately, those often innocently intended practices stray into illegality when digital rights protected content is copied and distributed to consumers who lack a right to access that content, such as a license or other entitlement to the content. Although legally playable content clips can be obtained from some sources, those clips are typically produced with promotional intent and reflect the editorial preferences of the owner or owners of the content, rather than its consumers. Consequently, there is a need in the art for a solution enabling the legal playing of personalized content clips produced from digital rights protected content.

SUMMARY

There are provided systems and methods for performing digital rights protected content playing, substantially as shown in and/or described in connection with at least one of the figures, and as set forth more completely in the claims.

DETAILED DESCRIPTION

Figure 1:
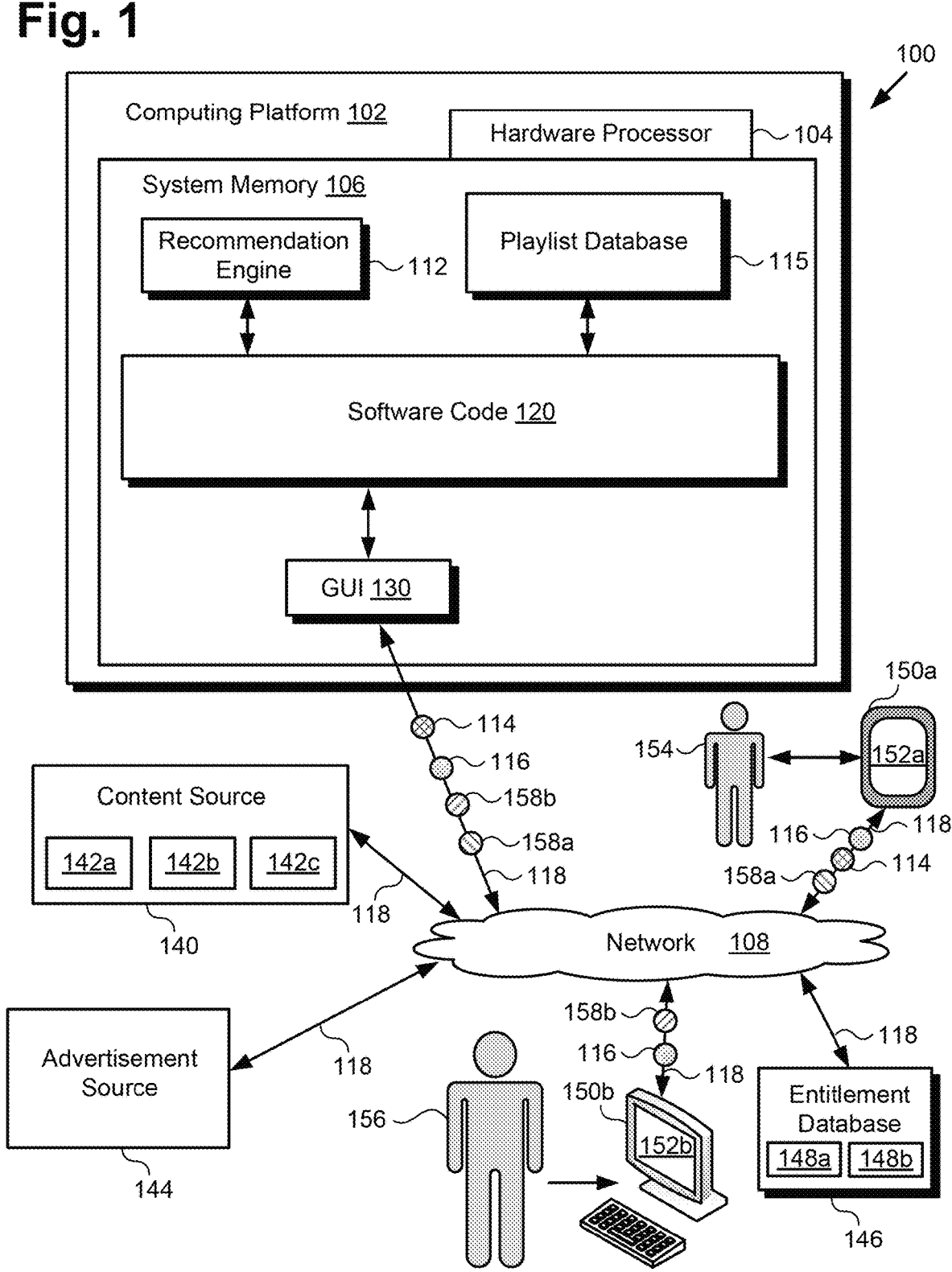
FIG. 1 shows an exemplary system for performing digital rights protected content playing, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for performing digital rights protected content playing that address and overcome the deficiencies in the conventional art. As stated above, the desire by a consumer to gain quick access to preferred portions of content for personal enjoyment may cause the consumer to make a personalized content clip by denoting favorite segments from an original version of content and stringing those segments together. That personalized content clip may then be played by being forwarded to friends or family, or by being posted to a social media platform. Unfortunately, those often innocently intended practices stray into illegality when digital rights protected content is copied and distributed to consumers who lack a right to access that content, such as a license or other entitlement to the content. Moreover, and as also stated above, although legally playable content clips can be obtained from some sources, those clips are typically produced with promotional intent and reflect the editorial preferences of the owner or owners of the content, rather than its consumers.

By contrast, the present application advantageously discloses a digital rights protected content playing solution that improves upon the conventional art by enabling a user to enjoy a personalized content clip without engaging in illicit copying or content distribution. Instead, according to the present inventive principles, a user may produce a playlist for a content clip (hereinafter "content compilation") that is personalized and includes metadata identifying the content segments to be included in the content compilation, as well as source locators, such as Uniform Resource Identifiers (URIs), for each of the content segments, but not those content segments themselves. The systems disclosed in the present application first confirm that the user has rights to access the identified segments, and then produces the playlist listing only those content segments to which the user has an access right. The playlist may then be output by such a system to the user producing the playlist (hereinafter "first user"), or to another user (hereinafter "second user").

The first user having produced the playlist may submit the playlist to the system at any subsequent time, resulting in substantially immediate playout of the content compilation corresponding to the playlist produced for the first user, in some implementations without further digital rights verification. If the second user receives the playlist, either from the system or from the first user, and wishes to enjoy a content compilation personalized by the first user, the second user may submit the playlist to the system. The system then determines whether the second user has access rights to the content segments identified by the playlist produced for the first user and generates a content compilation for the second user based on that playlist, but omitting those content segments to which the second user lacks an access right.

In some implementations, the systems disclosed by the present application may notify the second user which content segments identified by the playlist produced for the first user the second user lacks a right to access, before generating the content compilation for the second user. Moreover, in some implementations, such a system may offer the second user an opportunity to obtain the rights to access the content segments that the second user initially lacks.

In some implementations, the systems and methods disclosed by the present application may be substantially or fully automated. It is noted that, as used in the present application, the terms "automation," "automated," and "automating" refer to systems and processes that do not require the participation of a human analyst or editor. Although, in some implementations, a human system administrator may review the performance of the automated systems and the automated methods described herein, that human involvement is optional. Thus, the methods described in the present application may be performed under the control of hardware processing components of the disclosed automated systems.

FIG. 1 shows an exemplary system for performing digital rights protected content playing, according to one implementation. As shown in FIG. 1, system 100 includes computing platform 102 having hardware processor 104 and system memory 106 implemented as a non-transitory storage device. According to the present exemplary implementation, system memory 106 stores software code 120 providing graphical user interface (GUI) 130, recommendation engine 112, and playlist database 115.

As further shown in FIG. 1, system 100 is implemented within a use environment including communication network 108, first user system 150a including display 152a, first user 154 of first user system 150a, second user system 150b including display 152b, and second user 156 of second user system 150b. In addition, FIG. 1 shows content source 140, content 142a, 142b, and 142c obtainable from content source 140, advertisement source 144, entitlement database 146 storing entitlement portfolios 148a and 148b, content metadata 114, playlist 116, and content compilations 158a and 158b each corresponding to playlist 116. Also shown in FIG. 1 are network communication links 118 of communication network 108 interactively connecting system 100 with content source 140, advertisement source 144, entitlement database 146, and first and second user systems 150a and 150b. It is noted that although in some implementations, entitlement database 146 may merely be accessible to system 100 via communication network 108 and network communication links 118, in other implementations, entitlement database 146 may be included as part of system 100.

It is further noted that although only one content source, one advertisement source, and one entitlement database are shown in FIG. 1 in the interests of conceptual clarity, in other implementations, each of content source 140, advertisement source 144, and entitlement database 146 may correspond to multiple instances of respective content sources, advertisement sources, and entitlement databases. In addition, although FIG. 1 depicts three items of content obtainable from content source 140, once again that representation is provided merely in the interests of conceptual clarity. More generally, content source 140 may correspond to one or more content providers capable of providing hundreds, thousands, or tens of thousands of content items.

Moreover, content 142a, 142b, and 142c may include one or more of a variety of different types of media content. For example, 142a, 142b, and 142c may take the form of one or more of movie content, photographs, podcast content, television (TV) programming content or other episodic media content, music content, audio book content, digital book content, digital news content, or video game content.

It is also noted that entitlement portfolio 148a in entitlement database 146 is an entitlement portfolio of first user 154, identifying content to which first user 154 has an access right, while entitlement portfolio 148b is an analogous entitlement portfolio of second user 156. As defined for the purposes of the present application, the feature "entitlement portfolio" refers to a record of all relevant content to which an entitlement in the form of ownership and/or temporary use has been obtained by a user across one or more content sources 140. Thus, for example, where content 142a, 142b, and 142c are in the form of movies, entitlement portfolio 148a of first user 154 identifies movies previously purchased and/or rented by first user 154 from one or more content sources 140.

Although the present application refers to software code 120 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

Moreover, although FIG. 1 depicts software code 120, recommendation engine 112, and playlist database 115 as being co-located in system memory 106, that representation is merely provided as an aid to conceptual clarity. More generally, system 100 may include one or more computing platforms 102, such as computer servers for example, which may be co-located, or may form an interactively linked but distributed system, such as a cloud-based system, for instance. As a result, hardware processor 104 and system memory 106 may correspond to distributed processor and memory resources within system 100. In one such implementation, computing platform 102 may correspond to one or more web servers accessible over a packet-switched network such as the Internet, for example. Alternatively, computing platform 102 may correspond to one or more computer servers supporting a wide area network (WAN), a local area network (LAN), or included in another type of private or limited distribution network.

Although first user system 150a is shown as a smartphone and second user system 150b is shown as a desktop computer in FIG. 1, those representations are also provided merely as examples. More generally, first and second user systems 150a and 150b may be any suitable mobile or stationary computing devices or systems that implement data processing capabilities sufficient to enable use of GUI 130, support connections to communication network 108, and implement the functionality ascribed to first and second user systems 150a and 150b herein. For example, in other implementations, either or both of first and second user systems 150a and 150b may take the form of a laptop computer, a tablet computer, a smart TV, an e-reader, or a game console, for example. Alternatively, in some implementations, either or both of first and second user systems 150a and 150b may take the form of a wearable personal communication device, such as an augmented reality (AR) or virtual reality (VR) headset or glasses, a smartwatch, or another smart personal accessory.

First user 154, who may be a consumer of media content such as movie content, photographs, podcast content, television (TV) programming content or other episodic media content, music content, audio book content, digital book content, digital news content, or video game content, for example, may utilize first user system 150a to interact with system 100 via GUI 130. For example, first user 154 may utilize a content editing pane of GUI 130 rendered on display 152a to generate content metadata 114 identifying content segments for use in producing playlist 116. It is noted that display 152a of first user system 150a, as well as display 152b of second user system 150b, may take the form of a liquid crystal display (LCD), a light-emitting diode (LED) display, an organic light-emitting diode (OLED) display, or any other suitable display screen that performs a physical transformation of signals to light. It is further noted that, in some implementations, display 152a or 152b may be integrated with respective first and second user systems 150a and 150b, such as when first and second user systems 150a and 150b take the form of smartphones, or laptop or tablet computers for example. However, in other implementations, for example where first and second user systems 150a and 150b take the form of computer towers in combination with a desktop monitor, displays 152a and 152b may be communicatively coupled to, but not physically integrated with first and second user systems 150a and 150b.

Hardware processor 104 of system 100 may execute software code 120 to produce playlist 116 for first user 154 based on content metadata 114 received from first user 154 and further based on entitlement portfolio 148a of first user 154, such that playlist 116 lists only content segments to which first user 154 has an access right. First user 154 may have such an access right to content including one or more of the content segments identified by content metadata 114 due to enrolment in a subscription service, such as Netflix® or Hulu®, for example, by virtue of having rented a license to the content from a video-on-demand (VOD) service, or by virtue of having purchased a license to the content from content source 140.

Hardware processor 104 of system 100 may further execute software code 120 to output playlist 116 to first user 154, and/or to second user 156 identified by first user 154. In some implementations, first user 154 may utilize playlist 116 for his/her personal entertainment. In those use cases, system 100 may generate content compilation 158a for first user 154 using playlist 116. Alternatively, or in addition, first user 154 may send playlist 116 with second user 156, for example by transmitting playlist 116 to second user 156 via email, text message, or a native messaging application provided by first user system 150a. In those use cases, second user 156 may use playlist 116 to consume content listed in playlist 116 to which second user 156 has an access right.

In order to consume content compilation 158b corresponding to playlist 116, second user 156 may submit playlist 116 produced for first user 154 to system 100. Hardware processor 104 may then execute software code 120 to generate content compilation 158b based on playlist 116 and entitlement portfolio 148b of second user 156 such that content compilation 158b omits content segments listed in playlist 116 to which second user 156 lacks access rights.

That is to say, system 100 advantageously enables first user 154 to create playlist 116 of content segments and to send playlist 116 to others, without violating the intellectual property rights of the owner or owners of the content including the content segments identified by content metadata 114.

In some implementations, and at the discretion of first user 154, playlist 116 produced for first user 154 may be stored in playlist database 115 of system 100, and may be made available to other users of system 100. In one such use case, for example, second user 156 of system 100 may access playlist database 115 to enjoy content compilations corresponding to individual playlists, or to create mashups from multiple playlists produced for other users and stored in playlist database 115.

Figure 2:
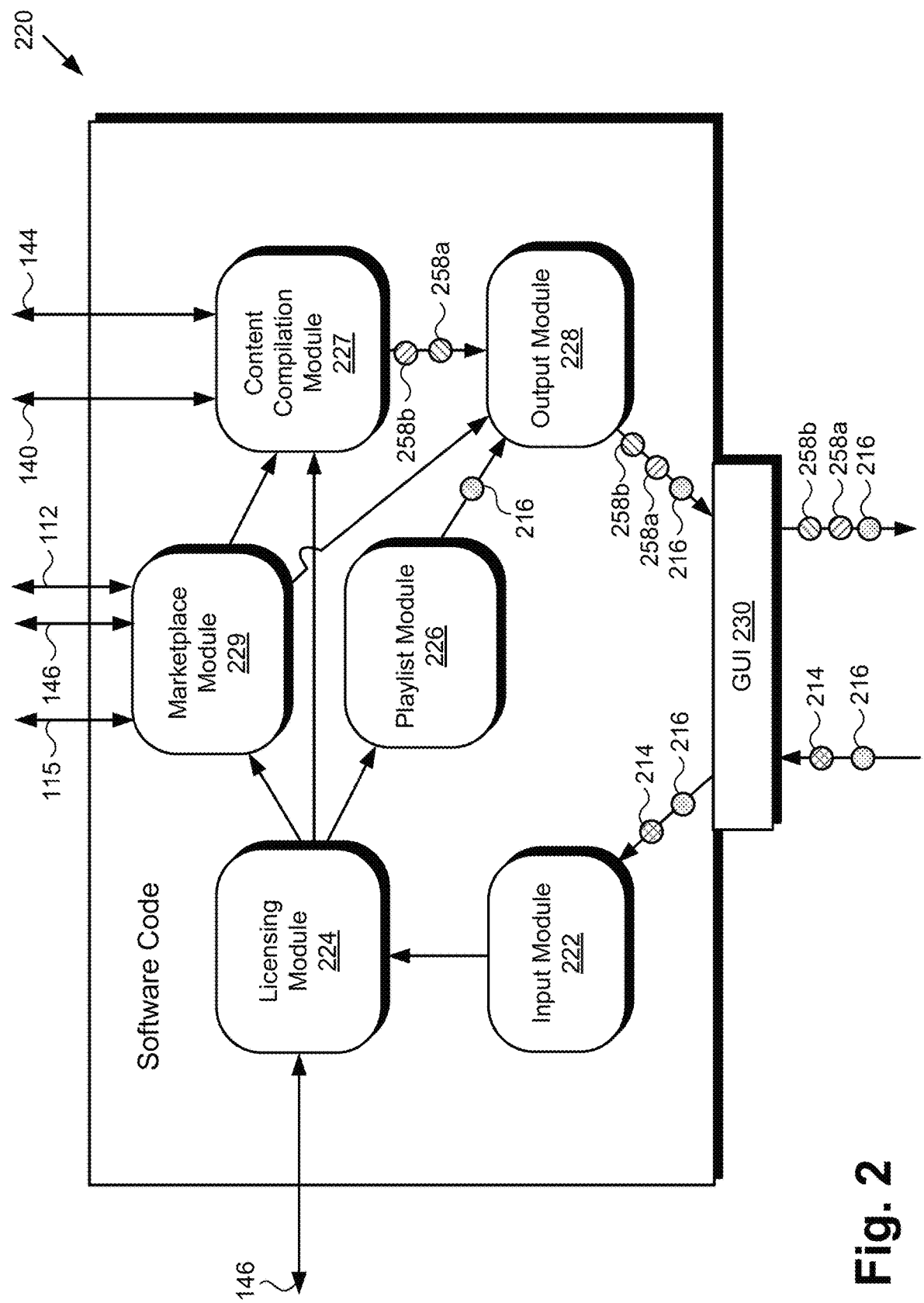
FIG. 2 shows a more detailed exemplary representation of a software code suitable for use in the system of FIG. 1, according to one implementation.

Referring now to FIG. 2, FIG. 2 shows an exemplary diagram of software code 220 suitable for use by system 100, in FIG. 1, according to one implementation. As shown in FIG. 2, software code 220 is configured to receive content metadata 214 as an input and to provide playlist 216 as an output via GUI 230, as well as to receive playlist 216 as an input and to provide content compilation 258a and/or content compilation 258b as an output or outputs via GUI 230. As further shown in FIG. 2, software code 220 includes input module 222, licensing module 224, playlist module 226, content compilation module 227, output module 228, and may include marketplace module 229. Also shown in FIG. 2, licensing module 224 of software code 220 is configured to communicate with entitlement database 146, in FIG. 1, while content compilation module 227 is configured to communicate with content source 140 and may be configured to communicate with advertisement source 144. Moreover, when included in software code 220, marketplace module 229 may be configured to communicate with one or more of recommendation engine 112, playlist database 115, and entitlement database 146, in FIG. 1.

Content metadata 214, playlist 216, content compilation 258a, and content compilation 258b, in FIG. 2, correspond respectively in general to content metadata 114, playlist 116, content compilation 158a, and content compilation 158b, in FIG. 1, and those respective corresponding features may share any of the characteristics attributed to either corresponding feature by the present disclosure. In addition, software code 220 and GUI 230 correspond in general to software code 120 and GUI 130, in FIG. 1, and those respective corresponding features may share any of the characteristics attributed to either corresponding feature by the present disclosure. That is to say, like software code 220, software code 120 may include features corresponding respectively to input module 222, licensing module 224, playlist module 226, content compilation module 227, output module 228, and marketplace module 229.

Figure 3:
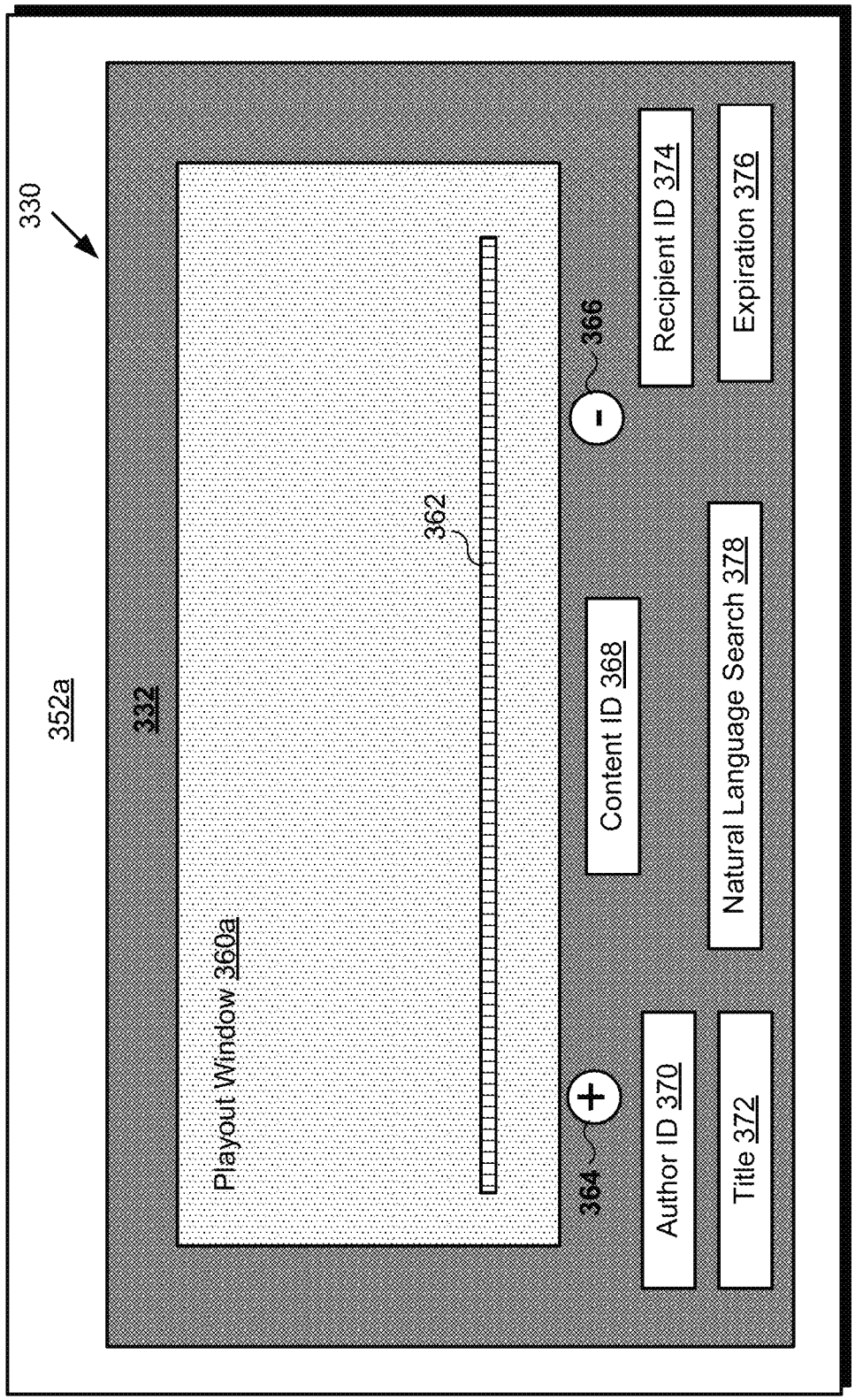
FIG. 3 shows an exemplary content editing pane provided by a graphical user interface (GUI) of the system in FIG. 1, according to one implementation.

FIG. 3 shows exemplary content editing pane 332 of GUI 330 rendered on display 352a, according to one implementation. GUI 330 corresponds in general to GUI 130/230 in FIGS. 1 and 2, and those features may share the characteristics attributed to any of those corresponding features by the present disclosure. Thus, although not apparent from FIGS. 1 and 2, GUI 130/230 may be configured to provide editing pane 332 including the additional features described below. However, it is noted that those features, including the specific input fields shown in FIG. 3, are merely exemplary. That is to say, in various implementations, content editing pane 332 of GUI 330 may include additional features and input fields not shown in FIG. 3, or may omit one or more of the features and input fields shown in FIG. 3. It is further noted that display 352a on which content editing pane 332 of GUI 330 is shown to be rendered in FIG. 3 corresponds in general to display 152*a* of first user device 150*a*, in FIG. 1.

Referring to FIGS. 1 and 3 in combination, first user 154 may utilize content editing pane 332 of GUI 130/330 to identify content segments for inclusion in personalized content compilation 158*a*. For example, first user 154 (the author of playlist 116 and corresponding content compilation 158) is identified in Author ID field 370. First user 154 may select content using Title field 372, and may watch and/or listen to that content as it is played out in Playout Window 360*a*. During playout of the content, first user 154 may utilize "begin segment" control 364 and "end segment" control 366 to identify a segment or segments of the content to be included in content compilation 158*a*, based on timecode 362 locations of the beginning and end of the content segment, or video frame numbers, or audio track numbers, for example. Alternatively, or in addition, first user 154 may use Natural Language Search field 378 to specify one or more content segments. For example, where first user 154 desires a content compilation including action scenes drawn from all movies included in a movie franchise, first user 154 may list the movie titles or franchise name in Title field 372, and enter "all action scenes" in Natural Language Search field 378.

In some implementations, content editing pane 332 of GUI 330 may also include one or more of Content ID field 368, Recipient ID field 374, and Expiration field 376. Content ID field 368 may include a unique code or number assigned to content identified in Title field 372. For example, in some implementations, first user may 154 enter a content title or titles in Title field 372 and Content ID field 368 may be auto-filled by software code 120/220 in FIGS. 1 and 2, executed by hardware processor 104.

Recipient ID field 374 may be utilized by first user 154 if first user 154 wishes to have content compilation playlist 116/216 sent directly to someone else by system 100, such as to second user 156, for example. Otherwise, in some implementations, the default entry in Recipient ID field 374 can match the entry in Author ID field 370, in which case content compilation playlist 116/216, when produced by software code 120/220 for first user 154, is sent only to first user 154.

Expiration field 376 enables first user 154 to specify how long a particular content compilation can be accessed, either by first user 154 or by second user 156 with whom first user 154 decides to send playlist 116/216. In some implementations, the expiration of content compilation 158*a*/258*a* or 158*b*/258*b* corresponding to playlist 116/216 may be an absolute expiration, identified by a definite duration or by a specific date and time determined by first user 154. However, in other implementations, the expiration of content compilation 158*a*/258*a* or 158*b*/258*b* corresponding to playlist 116/216 may be relative to some action. By way of example, in some implementations, the expiration of each instance of content compilation 158*a*/258*a* or 158*b*/258*b* may occur after an interval triggered by generation of that instance. In other words, content compilation 158*a*/258*a* corresponding to playlist 116/216 may expire after a predetermined interval, selected by first user 154, and triggered by generation of content compilation 158*a*/258*a* for first user 154. Analogously, content compilation 158*b*/258*b* corresponding to playlist 116/216 may expire after the same predetermined interval selected by first user 154, but triggered in that instance by generation of content compilation 158*b*/258*b* for second user 156.

Figure 4:
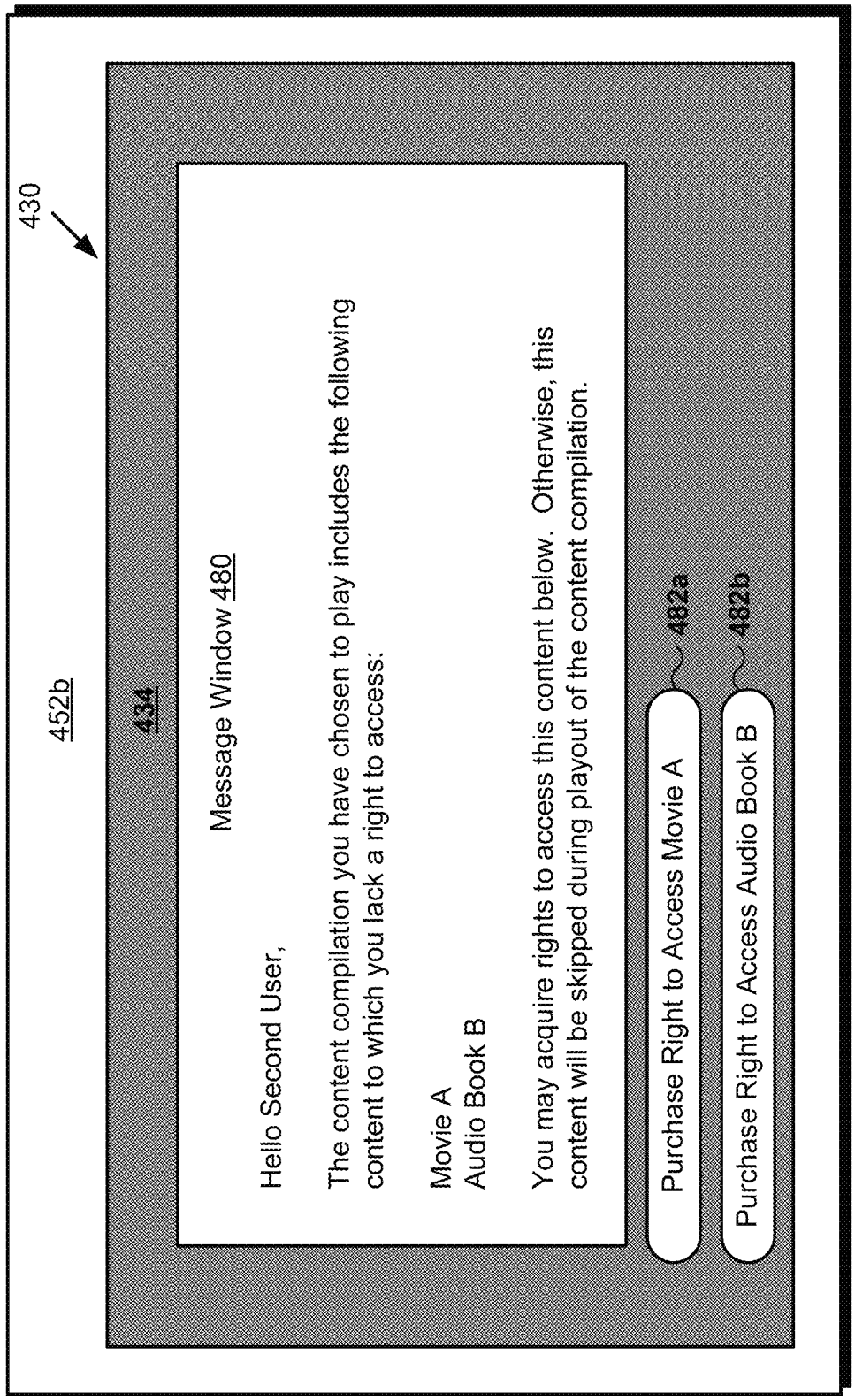
FIG. 4 shows an exemplary introductory message pane provided by the GUI of the system in FIG. 1, according to one implementation.

Referring to FIG. 4, FIG. 4 will be described briefly, with a more detailed discussion of its features provided below, by reference to the flowchart shown in FIG. 5B. FIG. 4 shows exemplary introductory message pane 434 of GUI 430, rendered on display 452*b* and including message window 480 and purchase options 482*a* and 482*b*, according to one implementation. GUI 430 corresponds in general to GUI 130/230/330 in FIGS. 1, 2, and 3, and those features may share the characteristics attributed to any of those corresponding features by the present disclosure. Thus, although not apparent from FIGS. 1 and 2, GUI 130/230 may be configured to provide introductory message pane 434. However, it is noted that the specific features of introductory message pane 434 shown in FIG. 4 are merely exemplary. That is to say, in various implementations, introductory message pane 434 of GUI 430 may include additional features not shown in FIG. 4, or may omit one or more of the features shown in FIG. 4. It is further noted that display 452*b* on which introductory message pane 434 of GUI 430 is shown to be rendered in FIG. 4 corresponds in general to display 152*b* of second user device 150*b*, in FIG. 1.

Figure 5A:
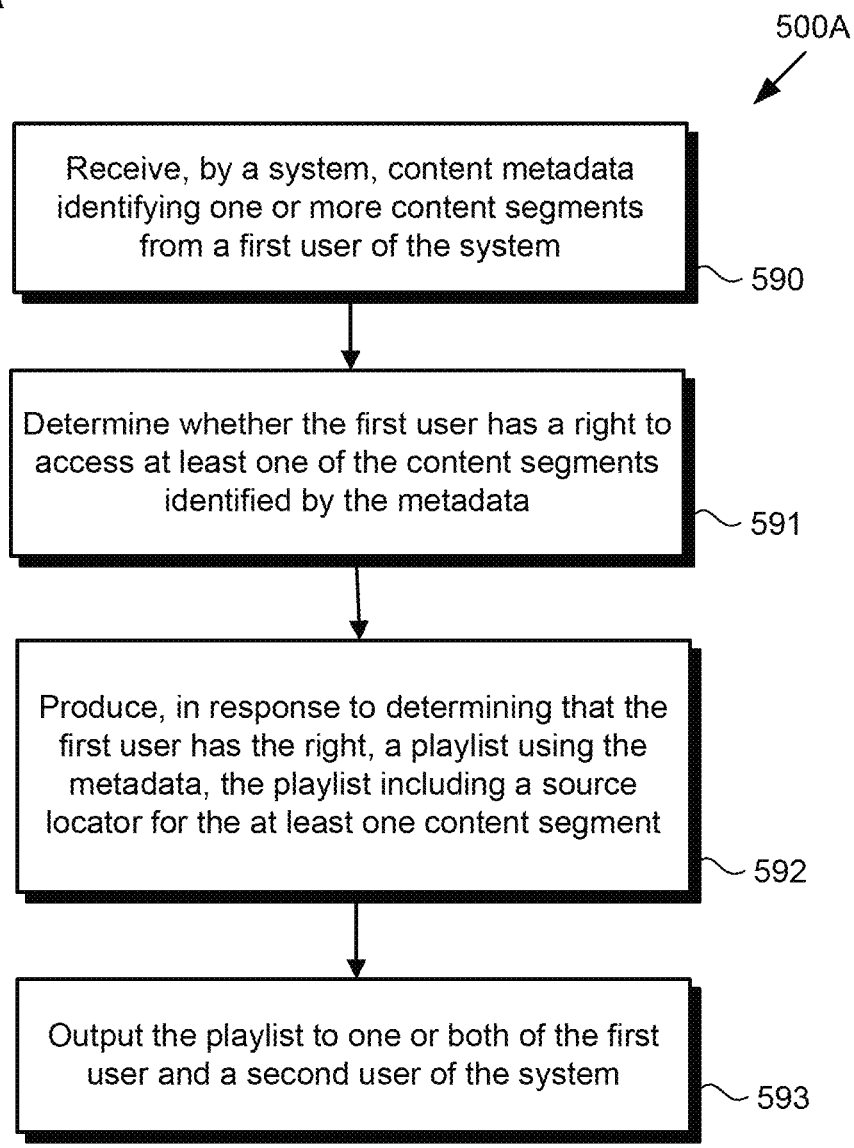
FIG. 5A shows a flowchart presenting an exemplary method for performance by the system in FIG. 1, according to one implementation.

The functionality of software code 120/220 in FIGS. 1 and 2 will be further described by reference to FIGS. 5A and 5B. FIG. 5A shows flowchart 500A presenting an exemplary method for performance by system 100, in FIG. 1, according to one implementation, while FIG. 5B shows flowchart 500B presenting an exemplary method for performing digital rights protected content playing, according to one implementation. With respect to the methods outlined in FIGS. 5A and 5B, or the method outlined by the combination of FIGS. 5A and 5B, it is noted that certain details and features have been left out of flowcharts 500A and 500B in order not to obscure the discussion of the inventive aspects disclosed in the present application.

Referring to FIG. 5A in combination with FIGS. 1, 2, and 3 flowchart 500A begins with receiving, by system 100, content metadata 114/214 identifying one or more content segments from first user 154 (action 590). The content segments identified by content metadata 114/214 may include segments of one or more of a variety of different types of media content. For example, the content segments identified by content metadata 114/214 may include photographs, or segments of one or more of movie content, podcast content, TV programming content or other episodic media content, music content, audio book content, digital book content, digital news content, or video game content.

Content metadata 114/214 may be generated by first user system 150*a*, in response to inputs to content editing pane 332 of GUI 130/230/330 rendered on display 152*a* of first user system 150*a*. As discussed above by reference to FIG. 3, first user 154 may select content using Title field 372 of editing pane 332, and may watch and/or listen to that content as it is played out in Playout Window 360*a* of editing pane 332. During playout of the content, first user 154 may utilize "begin segment" control 364 and "end segment" control 366 to generate metadata 114/214 identifying a desired segment or segments of the content, based on timecode 362 locations of the beginning and end of the content segment, or video frame numbers, or audio track numbers, for example. Alternatively, or in addition, first user 154 may use Natural Language Search field 378 of content editing pane 332 to specify one or more content segments. Content metadata 114/214 may be also generated in response to inputs to Recipient ID field 374 and/or Expiration field 376, as also discussed above.

As shown by FIG. 1, in one implementation, content metadata 114/214 may be received from first user system 150a by system 100 via communication network 108 and network communication links 118. Content metadata 114/214 may be received from first user system 150a by input module 222 of software code 120/220, executed by hardware processor 104, and using content editing pane 332 of GUI 130/230/330.

Continuing to refer to FIGS. 1, 2, 3, and 5A, flowchart 500A continues with determining whether first user 154 has a right to access at least one of the content segments identified by content metadata 114/214 (action 591). In use cases in which first user 154 has play access to content using Playout Window 360a of content editing pane 332, an access right to segments of that content can be presumed. However, where content metadata 114/214 identifies content segments based on inputs by first user 154 to Natural Language Search field 378, an access right to those content segments may or may not be held by first user 154, and therefore cannot be presumed. Determining whether first user 154 has a right to access at least one of the content segments identified by content metadata 114/214 may be performed by licensing module 224 of software code 120/220, executed by hardware processor 104, and by reference to entitlement portfolio 148a of first user 154, stored in entitlement database 146.

Flowchart 500A continues with producing, in response to determining that first user 154 has a right to access at least one of the content segments identified by content metadata 114/214 received in action 590, playlist 116/216 using that content metadata, playlist 116/216 including a source locator for each of the one or more content segments to which first user 154 has an access right (action 592). Production of playlist 116/216 using content metadata 114/214 may be performed by playlist module 226 of software code 120/220, executed by hardware processor 104.

As noted above, a significant advantage of the systems and methods disclosed in the present application is that a system user, such as first user 154, has complete discretion as to what segments of content to which first user 154 has an access right are to be included in personalized content compilation 158a/258a generated for first user 154. A further significant advantage of the present systems and methods is that, of the content segments identified by content metadata 114/214, only those content segments to which first user 154 has an access right are listed in playlist 116/216. That is to say, content segments identified by content metadata 114/214 to which first user 154 lacks access rights are not listed in playlist 116/216 produced for first user 154. Consequently, the present systems and methods are able to provide first user 154 with broad artistic discretion, while concurrently protecting the intellectual property rights of the owner or owners of the content segments selected by first user 154.

In some implementations, the source locator for each content segment included in playlist 116/216 may be a URI for obtaining that content segment, such as a Uniform Resource Locator (URL) for obtaining the content segment via communication network 108 and network communication links 118, for example. As noted above, the content segments identified by content metadata 114/214 may include photographs, or segments of one or more of movie content, podcast content, TV programming content or other episodic media content, music content, audio book content, digital book content, digital news content, or video game content. Moreover, in some implementations, those content segments included in playlist 116/216 may include a mix of different types of content.

Thus, in some implementations, playlist 116/216 may list more than one type of content segment. For example, playlist 116/216 may list one or more visual content segments, such as photographs or video, for example, and one or more audio content segments, such as music, voice over, or narration. Furthermore, in some implementations, playlist 116/216 may specify that a visual content segment and an audio content segment be played out concurrently. As a specific example, playlist 116/216 may include a segment from a movie based on a book, as well as a segment of that book in audio book form narrated by the author. In that use case, content playlist 116/216 may specify that the movie segment and audio segment by played out concurrently so that the author may seem to be describing the movie.

Flowchart 500A can conclude with outputting playlist 116/216 to one or both of first user 154 and second user 156 (action 593). In many use cases, playlist 116/216 produced by system 100 for first user 154 is sent solely to first user 154, who may then send playlist 116/216 to other users, such as second user 156. However, as shown in FIG. 3, in some implementations, first user 154 may identify another recipient of playlist 116/216, either in addition to, or in lieu of first user 154, by identifying that recipient in Recipient ID field 374 of content editing pane 332 provided by GUI 130/230/330.

Action 593 may be performed by output module 228 of software code 120/220, executed by hardware processor 104. For example, and as shown in FIG. 1, playlist 116/216 may be transmitted to one or both of first user device 150a utilized by first user 154 and second user device 150b utilized by second user 156, via communication network 108 and network communication links 118.

In implementations in which playlist 116/216 is output to first user 154, first user 154 may utilize playlist 116/216 to consume personalized content compilation 158a/258a. For example, first user 154 may submit playlist 116/216 to system 100 via GUI 130/230/330, communication network 108, and input module 222 of software code 120/220. Hardware processor 104 of system 100 may then execute content compilation module 227 to generate personalized content compilation 158a/258a for first user 154 and to playout personalized content compilation 158a/258a using output module 228 and GUI 130/230/330.

In some use cases, first user 154 may wish to obtain content compilation 158a/258a of favorite scenes from multiple movies, or favorite songs from multiple albums, for example. However, in other use cases, first user 154 may use system 100 to modify an existing creative work product to make the content included in that work product more enjoyable, or more suitable for a particular audience. As one specific example, first user 154 may edit a PG rated movie including some violence or scary scenes by using system 100 to edit out all scary scenes or scenes including violence to make the movie more suitable for enjoyment by children. As another example, first user 154 may edit an album of rap music by editing out lyrics that are profane or obscene.

As noted above, in some use cases, enjoyment of content compilation 158a/258a by first user 154 may include the ability to play some or all of that content with another user, such as second user 156. In those use cases, after receiving playlist 116/216 from system 100, first user 154 may send playlist 116/216 with second user 156 by transmitting playlist 116/216 to second user 156 via text message email, or any native messaging application on first user device 150a, for example. Second user 156 may then use system 100 to generate content compilation 158b/258b for second user 156 based on playlist 116/216 produced for first user 154, as outlined by flowchart 500B in FIG. 5B.

Figure 5B:
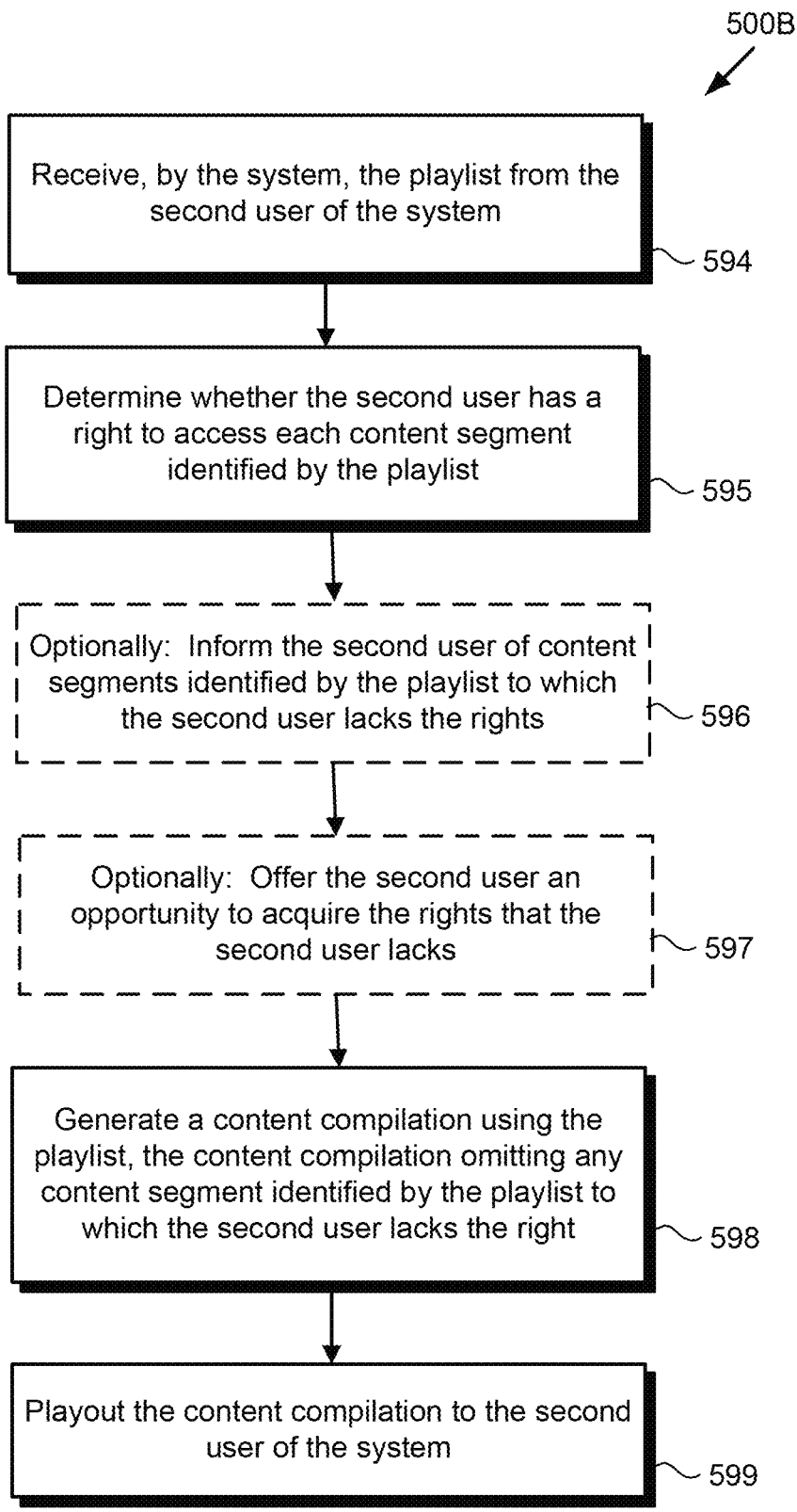
FIG. 5B shows a flowchart presenting exemplary actions for performing digital rights protected content playing, according to one implementation.

Referring to FIG. 5B in combination with FIGS. 1 and 2, flowchart 500B begins with receiving, by system 100 from second user 156, playlist 116/216 produced for first user 154 (action 594). As noted above, playlist 116/216 includes metadata identifying one or more content segments in the form of one or more of photographs, and/or segments of one or more of movie content, podcast content, TV programming content or other episodic media content, music content, audio book content, digital book content, digital news content, or video game content.

As shown by FIG. 1, in one implementation, playlist 116/216 may be received from second user system 150b by system 100 via communication network 108 and network communication links 118. Playlist 116/216 may be received from second user system 150b by input module 222 of software code 120/220, executed by hardware processor 104.

Continuing to refer to FIGS. 1, 2, and 5B, flowchart 500B continues with determining whether second user 156 has a right to access each of the content segments identified by playlist 116/216 (action 595). Determining whether first user 156 has a right to access each of the content segments identified by playlist 116/216 may be performed by licensing module 224 of software code 120/220, executed by hardware processor 104, and by reference to entitlement portfolio 148b of second user 156, stored in entitlement database 146.

In use cases in which second user 156 lacks a right to access one or more of the content segments identified by playlist 116/216, the method outlined by flowchart 500B may optionally include informing second user 156 which content segments second user 156 lacks access rights to (action 596). Moreover, in some implementations, flowchart 500B may further optionally include offering second user 156 the opportunity to acquire the access rights that second user 156 lacks (action 597).

For example, referring to FIG. 4, action 595 may be followed by actions 596 and 597 in which introductory message pane 434 is presented to second user 156 via GUI 130/230/430 and display 452b of second user system 150b. As shown in FIG. 4, message window 480 of introductory message pane 434 informs second user 156 that second user 156 lacks a right to "Movie A" and "Audio Book B" to which content segments identified by playlist 116/216 correspond.

According to the exemplary implementation shown in FIG. 4, introductory message pane 434 also provides second user 156 with purchase option 482a for the right to access "Movie A" and purchase option 482b for the right to access "Audio Book B." Message window 480 also informs second user 156 that any content segments identified by playlist 116/216 to which second user 156 lacks access rights will be skipped during playout of content compilation 158b/258b. When included in the method outlined by flowchart 500B, actions 596 and 597 may be performed by licensing module 224 and output module 228 of software code 120/220, executed by hardware processor.

Flowchart 500B continues with generating content compilation 158b/258b using playlist 116/216, content compilation 158b/258b omitting any content segment identified by playlist 116/216 to which second user 156 lacks access rights (action 598). Generation of content compilation 158b/258b using playlist 116/216 may be performed by content compilation module 227 of software code 120/220, executed by hardware processor 104. For example, and as shown by FIG. 2, content compilation module 227 may utilize the source locators included in playlist 116/216 to obtain the content segments identified by playlist 116/216 and to which second user 156 has access rights from one or more content sources 140.

It is contemplated that in some implementations, first user 154 and second user 156 may each have a subscription to the same streaming service, but those respective subscriptions may be at different service levels or impose different constraints. For example, first user 154 may have a commercial free subscription to "Streaming Service 1," while second user 156 may have a subscription to the same streaming service that requires the playout of commercials. In such a use case, playlist 116/216 produced for first user 154, as well as content compilation 158a/258a generated for first user 154, may omit advertising content. However, in that use case, content compilation 158b/258b generated for second user 156 using playlist 116/216 produced for first user 154 may nevertheless include advertising content omitted from playlist 116/216 due to the different constraints arising from the subscription status of second user 156. Conversely, where the subscription status of each of first user 154 and second user 156 is reversed from that described above, content compilation 158b/258b generated for second user 156 using playlist 116/216 produced for first user 154 may omit advertising content included in playlist 116/216.

As another exemplary use case, first user 154 may use system 100 to produce playlist 116/216 of digital news articles to track how an important news story has been reported across different news outlets and/or over time. First user 154 may wish to send that compilation of digital news with second user 156 and may email, text, or use any suitable native messaging application on first user device 150a to send playlist 116/216 to second user 156. System 100 may then receive playlist 116/216 produced for first user 154 from second user 156. In that use case, action 595 may include not only determining that second user 156 has an access right to the news sources referenced by playlist 116/216, but that exercising that access right will not exceed a predetermined quota of content items that second user 156 can access for free, or that might otherwise incur charges or penalties for second user 156.

Where a content segment listed in playlist 116/216 would cause second user 156 to 115 exceed a quota or incur a charge or penalty, system 100 may simply omit that content segment from content compilation 158b/258b during playout of content compilation 158b/258b to second user, thereby effectively skipping over one or more content segments identified by playlist 116/216. Alternatively, hardware processor 104 may execute software code 120/220 to substitute interstitial content segments for those content segments identified by playlist 116/216 but omitted from content compilation 158b/258b generated for second user 156. Such "replacement content" may take the form of promotional content for the omitted content segment, and/or may include advertising content.

Flowchart 500A can conclude with playing out content compilation 158b/258b to second user 156 (action 599). Action 599 may be performed by output module 228 of software code 120/220, executed by hardware processor 104. For example, and as shown in FIG. 1, content compilation 158b/258b may be streamed or otherwise transmitted to second user device 150b utilized by second user 156, via communication network 108 and network communication links 118.

Figure 6:
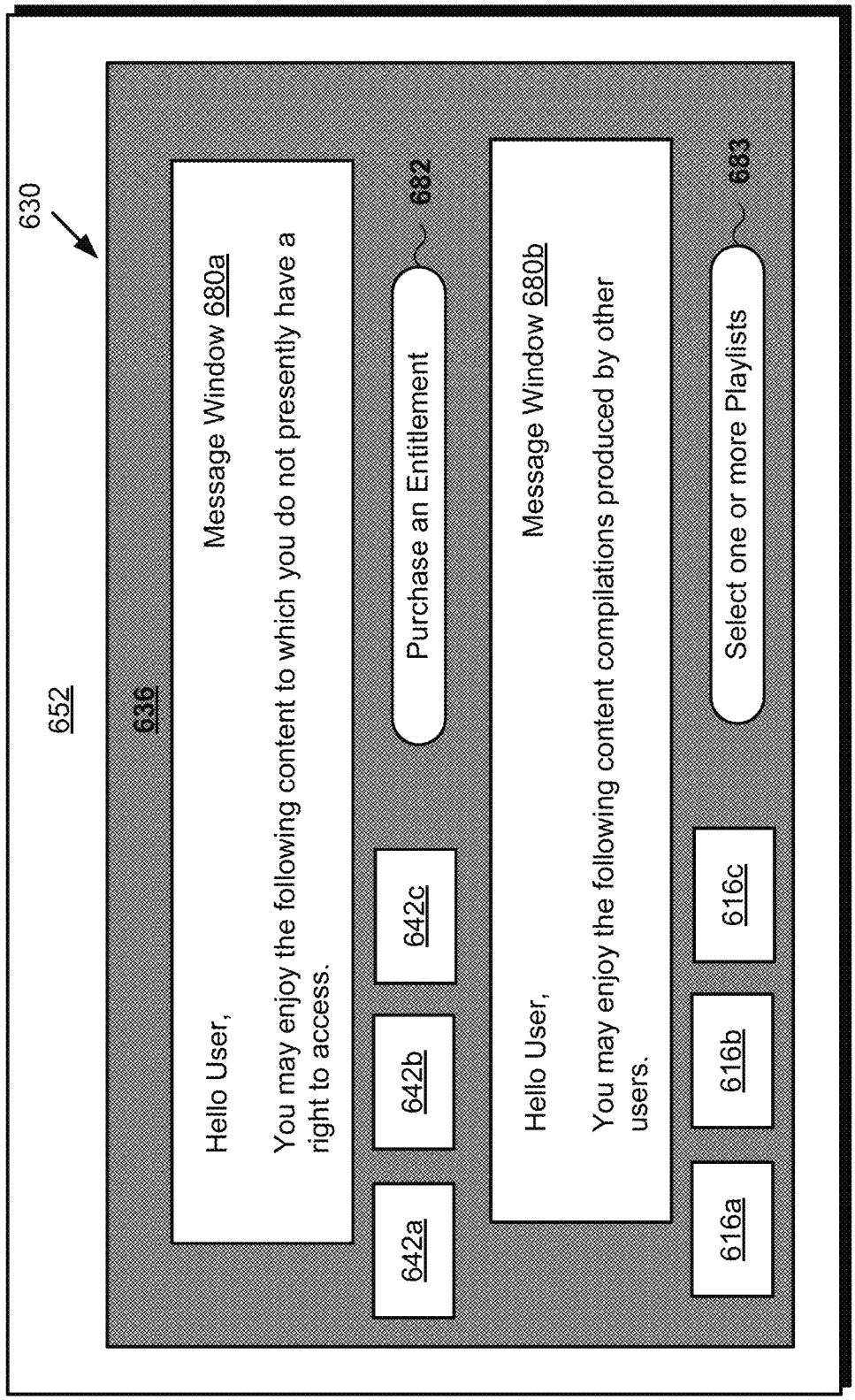
FIG. 6 shows an exemplary content promotion pane provided by the GUI of the system in FIG. 1, according to one implementation.

In some implementations, system 100 may recommend content to one or both of first user 154 and second user 156 based on playlist 116/216 produced for first user 154. Referring to FIG. 6, FIG. 6 shows exemplary content promotion pane 636 of GUI 630, rendered on display 652 and including message windows 680a and 680b, purchase option 682, and content compilation selection option 683, according to one implementation. Also shown in FIG. 6 are items of content 642a, 642b, and 642c, as well as previously produced playlists 616a, 616b, and 616c.

GUI 630 corresponds in general to GUI 130/230/330/430 in FIGS. 1, 2, 3, and 4, and those features may share the characteristics attributed to any of those corresponding features by the present disclosure. Thus, although not apparent from FIGS. 1 and 2, GUI 130/230 may be configured to provide content promotion pane 636. However, it is noted that the specific features of content promotion pane 636 shown in FIG. 6 are merely exemplary. That is to say, in various implementations, content promotion pane 636 of GUI 630 may include additional features not shown in FIG. 6, or may omit one or more of the features shown in FIG. 6. It is further noted that display 652 on which content promotion pane 636 of GUI 630 is shown to be rendered in FIG. 6 corresponds in general to either or both of display 152a of first user device 150a and display 152b of second user device 150b, in FIG. 1.

As shown in FIG. 6, message window 680a of content promotion pane 636 informs a user of system 100, i.e., first user 154 or second user 156, of content 642a, 642b, and 642c recommended as being likely of interest to the user based on playlist 116/216, and to which the user presently lacks access rights. As further shown in FIG. 6, message window 680b of content promotion pane 636 informs the user of content compilations 616a, 616b, and 616c previously produced for other users, made available for playing by those users, and recommended as being likely of interest to the user based on playlist 116/216.

It is noted that content 642a, 642b, and 642c correspond respectively in general to content 142a, 142b, and 142c, in FIG. 1, and those respective corresponding features may comprise any of the characteristics attributed to either corresponding feature by the present disclosure. Thus, like content 142a, 142b, and 142c, content 642a, 642b, and 642c may take the form of one or more of movie content, photographs, podcast content, TV programming content or other episodic media content, music content, audio book content, digital book content, digital news content, or video game content.

According to the exemplary implementation shown in FIG. 6, content promotion pane 636 provides the user with purchase option 682 for the right to acquire an entitlement to one or more of content 642a, 642b, and 642c. In addition, content promotion pane 636 provides the user with playlist selection option 683 enabling the user to select one or more of playlists 616a, 616b, and 616c. For example, according to one use case, the user can create a content compilation mashup using a combination of playlists selected from playlists 616a, 616b, and 616c.

Content promotion pane 636 of GUI 630 may be provided by marketplace module 229 of software code 120/220, executed by hardware processor. For instance, and as shown by FIG. 2, marketplace module 229 may utilize recommendation engine 112 and playlist database 115 to identify playlists 616a, 616b, and 616c likely to be of interest to the user, and may utilize recommendation engine 112 and entitlement database 146 to identify content 642a, 642b, and 642c likely to be of interest to the user and to which the user presently lacks access rights.

Thus, the present application discloses systems and methods for performing digital rights protected content playing that confer significant improvements over the conventional art. According to the inventive concepts disclosed in the present application, a first user may produce a playlist for a personalized content compilation that includes metadata identifying the content segments to be included in the content compilation, as well as source locators for each of the content segments, but not those content segments themselves. The systems and methods disclosed in the present application first confirm that the first user has rights to access the identified segments, and then produces the playlist so as to include only metadata for those content segments to which the first user has an access right.

If a second user wishes to enjoy the content compilation personalized by the first user, the second user may submit the playlist to the system. According to the systems and methods disclosed herein, the system then determines whether the second user has rights to access the content segments identified by the playlist produced for the first user, and generates a content compilation for the second user based on that playlist, but omitting those content segments to which the second user lacks an access right. Consequently, the systems and methods disclosed in the present application advantageously enable users to create playlists of content segments and to send those playlists to other users, without violating the intellectual property rights of the owner or owners of the content from which the content segments are extracted.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
   a computing platform having a hardware processor and a system memory storing a software code;
   the hardware processor configured to execute the software code to:
   receive, from a first user, metadata identifying a plurality of contents;
   produce a first content compilation for the first user using the metadata, the first content compilation identifying the plurality of contents;
   output the first content compilation to the first user;
   receive, from a second user, information identifying the first content compilation produced for the first user;
   determine one or more of the plurality of contents identified by the first content compilation that the second user lacks a right to access;
   generate a second content compilation for the second user using the first content compilation, the second content compilation omitting the one or more of the plurality of contents identified by the first content compilation that are determined the second user lacks the right to access; and
   playout the second content compilation to the second user.

2. The system of claim 1, wherein the plurality of contents comprise at least one visual content and at least one audio content.

3. The system of claim 2, wherein the first content compilation specifies that the at least one visual content and the at least one audio content be played out concurrently.

4. The system of claim 1, wherein the plurality of contents comprise at least one of movie content, photographs, podcast content, television programming content, music content, audio book content, digital book content, digital news content, or video game content.

5. The system of claim 1, wherein the first content compilation includes a source locator for the at least one of the plurality of contents.

6. The system of claim 1, wherein the hardware processor is further configured to execute the software code to:
inform the second user, before generating the second content compilation, of each of the determined at least one of the plurality of contents to which the second user lacks the right to access; and
offer the second user, before generating the second content compilation, an opportunity to acquire the right to access.

7. The system of claim 1, wherein the second content compilation includes advertising content omitted from the first content compilation.

8. The system of claim 1, wherein the second content compilation includes replacement content for each of the determined at least one of the plurality of contents to which the second user lacks the right to access.

9. The system of claim 8, wherein the replacement content is one of promotional content for advertising content or each of the determined at least one of the plurality of contents.

10. A method comprising:
receiving, from a first user, metadata identifying a plurality of contents;
producing a first content compilation for the first user using the metadata, the first content compilation identifying the plurality of contents;
outputting the first content compilation to the first user;
receiving, from a second user, information identifying the first content compilation produced for the first user;
determining one or more of the plurality of contents identified by the first content compilation that the second user lacks a right to access;
generating a second content compilation for the second user using the first content compilation, the second content compilation omitting the one or more of the plurality of contents identified by the first content compilation that are determined the second user lacks the right to access; and
playing out the second content compilation to the second user.

11. The method of claim 10, wherein the plurality of contents comprise at least one visual content and at least one audio content.

12. The method of claim 11, wherein the first content compilation specifies that the at least one visual content and the at least one audio content be played out concurrently.

13. The method of claim 10, wherein the plurality of contents comprise at least one of movie content, photographs, podcast content, television programming content, music content, audio book content, digital book content, digital news content, or video game content.

14. The method of claim 10, wherein the first content compilation includes a source locator for the at least one of the plurality of contents.

15. The method of claim 10, further comprising:
informing the second user, before generating the second content compilation, of each of the determined at least one of the plurality of contents to which the second user lacks the right to access; and
offering the second user, before generating the second content compilation, an opportunity to acquire the right to access.

16. The method of claim 10, wherein the second content compilation includes advertising content omitted from the first content compilation.

17. The method of claim 10, wherein the second content compilation includes replacement content for each of the determined at least one of the plurality of contents to which the second user lacks the right to access.

18. The method of claim 17, wherein the replacement content is one of promotional content for advertising content or each of the determined at least one of the plurality of contents.

19. A system comprising:
a computing platform having a hardware processor and a system memory storing a software code;
the hardware processor configured to execute the software code to:
receive, from a first user, metadata identifying a plurality of contents;
produce a first content compilation for the first user using the metadata, the first content compilation identifying the plurality of contents;
output the first content compilation to the first user;
receive, from a second user, information identifying the first content compilation produced for the first user;
determine one or more of the plurality of contents identified by the first content compilation that the second user lacks a right to access;
generate a second content compilation for the second user using the first content compilation, the second content compilation including advertising content omitted from the first content compilation when the second content compilation also includes a first one of the one or more of the plurality of contents identified by the first content compilation that are determined the second user lacks the right to access; and
playout the second content compilation to the second user.

20. The system of claim 19, wherein the hardware processor is further configured to execute the software code to:
omit, from the second content compilation, a second one of the one or more of the plurality of contents identified by the first content compilation that are determined the second user lacks the right to access.

* * * * *